(12) United States Patent
Matsuda et al.

(10) Patent No.: US 8,422,352 B2
(45) Date of Patent: Apr. 16, 2013

(54) OPTICAL PICKUP DEVICE

(75) Inventors: Norio Matsuda, Hanno (JP); Yoshitaka Ono, Saitama (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/260,969

(22) PCT Filed: Mar. 30, 2009

(86) PCT No.: PCT/JP2009/056525
§ 371 (c)(1),
(2), (4) Date: Oct. 14, 2011

(87) PCT Pub. No.: WO2010/116455
PCT Pub. Date: Oct. 14, 2010

(65) Prior Publication Data
US 2012/0020197 A1    Jan. 26, 2012

(51) Int. Cl.
*G11B 7/00* (2006.01)
(52) U.S. Cl.
USPC ............ 369/112.23; 369/112.24; 359/642
(58) Field of Classification Search ............ 369/112.01, 369/112.23, 109.01, 112.24, 44.37; 359/642
See application file for complete search history.

(56) References Cited

U.S. PATENT DOCUMENTS

| | | | | |
|---|---|---|---|---|
| 5,088,082 A * | 2/1992 | Yamada et al. | ................. | 369/71 |
| 5,128,923 A * | 7/1992 | Hasegawa et al. | ............ | 369/292 |
| 6,317,401 B1 * | 11/2001 | Masaki et al. | ................... | 369/71 |
| 6,496,257 B1 * | 12/2002 | Taniguchi et al. | ......... | 356/239.2 |
| 2002/0085473 A1 * | 7/2002 | Kim et al. | ........................ | 369/71 |
| 2009/0059761 A1 * | 3/2009 | Watanabe et al. | ............. | 369/100 |

FOREIGN PATENT DOCUMENTS

| | | |
|---|---|---|
| JP | 2002-074717 | 3/2002 |
| JP | 2003-051134 | 2/2003 |
| JP | 2003-217168 | 7/2003 |
| JP | 2005-071503 | 3/2005 |
| JP | 2007-328848 | 12/2007 |
| WO | 2007-142020 | 12/2007 |

OTHER PUBLICATIONS

International Search Report—PCT/JP2009/056525—Jun. 23, 2009.

* cited by examiner

*Primary Examiner* — Thomas Alunkal
(74) *Attorney, Agent, or Firm* — Young & Thompson

(57) ABSTRACT

An optical pickup device, which can effectively prevent occurrence of trouble in recording and reproducing of information due to the fact that an objective lens for each optical beam is contaminated while not adding unnecessary parts and while reducing a cost, is provided. An optical pickup device (P1) which performs the recording or reproducing of information in or from an optical disc (13) by using an optical beam (B) or (D), comprises: objective lenses (11) and (12) on which cleaning films which are activated by radiation of the optical beam (B) and clean their surfaces are formed in an optical path, and a control unit (15) for setting an optical path of the optical beam (B) in such a way that the optical beam (B) reflected by the optical disc (13) is radiated on the objective lens (12).

5 Claims, 4 Drawing Sheets

P1

OPTICAL PICKUP DEVICE

TECHNICAL FIELD

The present invention relates to a technical field of an optical pickup device. In particular, the present invention relates to a technical field of an optical pickup device which carries out at least one of recording and reproduction of information in and from a recording medium, using a plurality of optical beams whose frequencies are different from each other.

BACKGROUND ART

Generally, in an optical recording and reproduction of information in which an optical beam is used, it is necessary to focus an optical beam on a signal recording surface of a recording medium, such as an optical disc, using a so-called objective lens. At this time, in particular, if a surface of the objective lens is contaminated due to the fact that a film or the like composed of organic matter or the like is formed thereon, the focusing performance is reduced, or the transmittance itself of optical beam or the like is reduced, because of the reflection or the like based on the film or the like. As a result, for example, the reduction of S/N ratio or the like occurs in recording and reproduction. In many cases, a film composed of organic matter or the like is formed due to the fact that, for example, a finger of a person touches a surface of an objective lens exposed to a recording medium, or dust in air is deposited on the surface.

Patent Document No. 1 mentioned below discloses that a cleaning film of photo-catalyst or the like activated by radiation of an optical beam for recording and reproduction is formed on a surface of an objective lens, and thereby, the recording and reproduction by use of the optical beam, and the cleaning of objective lens by use of the cleaning film are carried out concurrently.

Further, Patent Document No. 2 mentioned below discloses that a radiation unit for radiating an optical beam for cleaning, and a radiation unit for radiating an optical beam for recording and reproduction are provided separately, and the optical beam for cleaning is reflected by a recording medium, and radiated on an objective lens, and thereby, the objective lens is cleaned, even in a condition where the recording medium is loaded.

The cleaning of an objective lens by a cleaning film is carried out due to the fact that the cleaning film is activated by the radiation of an optical beam on the cleaning film, and thereby, organic matter or the like attached to a surface thereof is dissolved into carbon dioxide, water (moisture), and the like, and disappears.

On the other hand, in recent years, in addition to a conventional CD (Compact Disc) and a conventional DVD (Digital Versatile Disc), a high-density optical disc in which a recording capacity of information is further increased becomes generalized. Further, a recording and reproduction apparatus, which has compatibility of being capable of recording and reproducing information in and from a plurality of kinds of optical discs by one recording and reproduction apparatus, is also developed.

At this time, while information can be recorded and reproduced with a so-called red laser beam as an optical beam in the case of a CD and a DVD, information is recorded and reproduced with a blue laser beam whose wavelength is shorter than the red laser beam in the case of a high-density optical disc. In a recording and reproduction apparatus mentioned above which has compatibility, generally, an objective lens for a CD/DVD (namely, for a red laser beam), and an objective lens for a high-density optical disc (namely, for a blue laser beam) are provided separately, and by adequately changing these objective lenses, information is recorded and reproduced in and from a CD or a DVD, or a high-density optical disc.

Patent Document No. 1: Japanese Patent Laid-open No. 2003-51134 (for example, FIG. 3)

Patent Document No. 2: International Publication No. 2007/142020 (for example, FIG. 2)

SUMMARY OF THE INVENTION

Problems to be Solved by the Invention

At the present time, while a cleaning film to be activated by a blue laser beam has been developed, a cleaning film to be activated by a red laser beam has not yet been developed.

Therefore, there is a problem in that if an objective lens for a CD/DVD is intended to be cleaned by an interaction between a cleaning film and an optical beam, it is necessary to provide a light emitting unit for emitting a blue laser beam for cleaning an objective lens for a CD/DVD on which a cleaning film has been formed, separately from a light emitting unit for emitting a red laser beam for recording and reproducing in and from a CD/DVD.

Further, there is a problem in that, for the cleaning, it is necessary to cause an optical path for a blue laser beam to be the same as one for a red laser beam to radiate the blue laser beam on an objective lens for a CD/DVD, resulting in unnecessary optical parts being added and an adjustment of an optical path being complicated.

Furthermore, there is a problem in that even if a cleaning film to be activated by a red laser beam is newly developed, it is necessary to form a cleaning film for a high-density optical disc and one for a CD/DVD separately, resulting in a cost of parts becoming high, a manufacturing process becoming a long term, or the like.

The present invention has been accomplished in view of several problems mentioned above, and therefore, it is an example of an object of the invention to provide an optical pickup device of being capable of effectively preventing occurrence of trouble in recording and reproducing of information due to the fact that an objective lens for each optical beam is contaminated, while not adding unnecessary parts, and while reducing a cost.

Means for Solving the Problems

In order to solve the above problems, the invention according to claim 1 relates to an optical pickup device which performing at least one of recording or a reproducing of information in or from a recording medium by using an optical beam, comprising:

a plurality of collecting device, corresponding to a plurality of the optical beams which have frequencies different from each other, on which cleaning films which are activated by radiation of one of the optical beams and clean the collecting device are formed in an optical path, and a setting device which sets the optical path of the one optical beam in such a way that the one optical beam reflected by the recording medium is radiated on the other collecting device corresponding to an optical beam other than the one optical beam.

BRIEF DESCRIPTION OF DRAWINGS

FIG. 2A is a view showing the positional relationship, and FIG. 2B is a view showing a range concerning the positional relationship.

Figure 1:
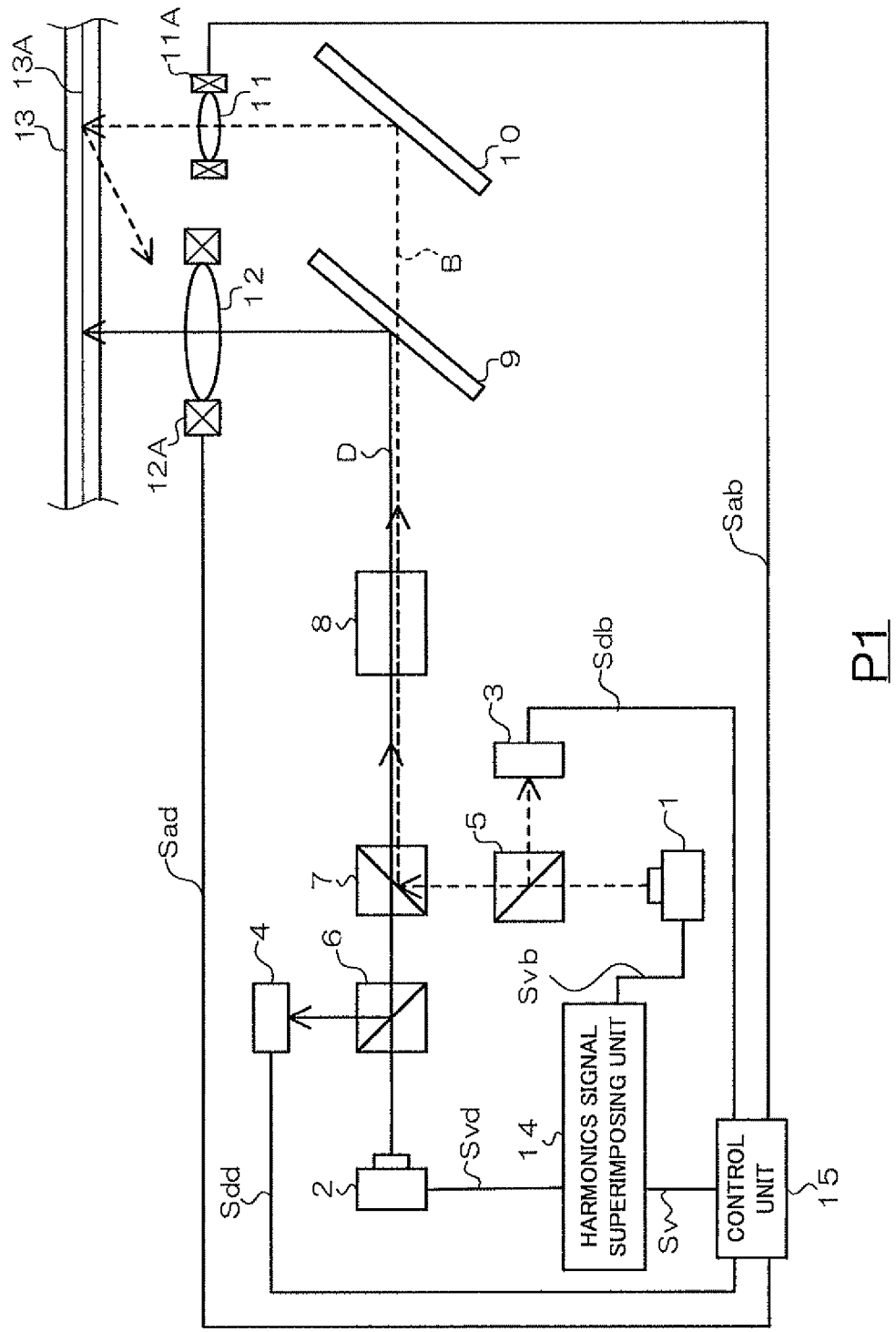
FIG. 1 is a block diagram showing an arrangement of an optical pickup device according to an embodiment.

EXPLANATION OF REFERENCE NUMERALS 1, 2: emitting unit
3, 4: light detecting unit
11, 12: objective lens
11A, 12A: actuator
13: optical disc
13A: signal recording surface
14: harmonics signal superimposing unit
15: control unit
100: harmonics signal
P1, P2: optical pickup device

BEST MODE FOR CARRYING OUT THE INVENTION

Referring now to the drawings, a best mode for carrying out the invention will be described. An embodiment and a modification described below are ones in which the present invention has been applied to an optical pickup device which has an objective lens for recording and reproducing in and from a CD/DVD, and an objective lens for recording and reproducing in and from a high-density optical disc, separately.

(I) Embodiment

Figure 2:
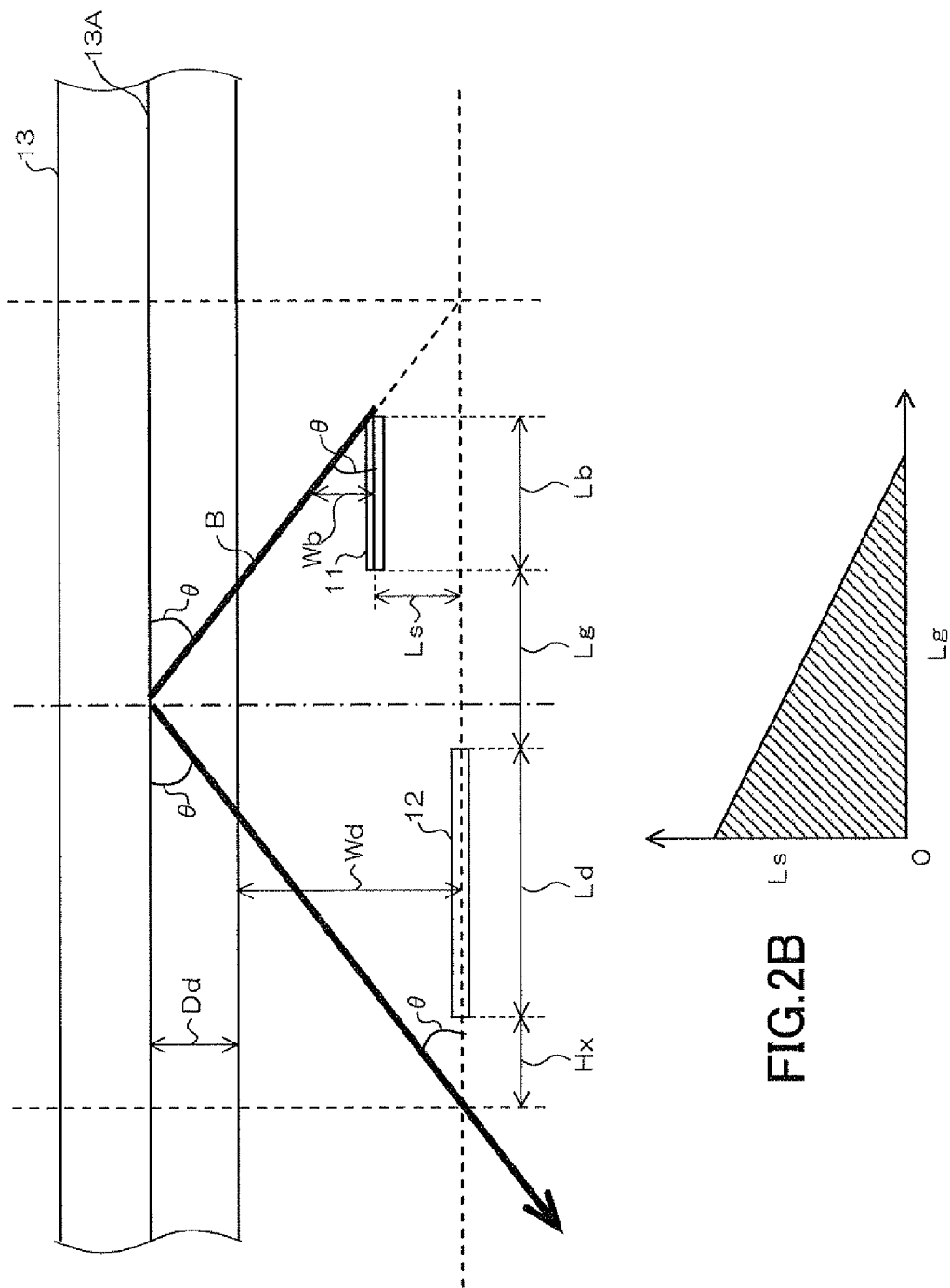
FIGS. 2A and 2B are views showing a positional relationship between an objective lens and the like according to the embodiment.
Figure 3:
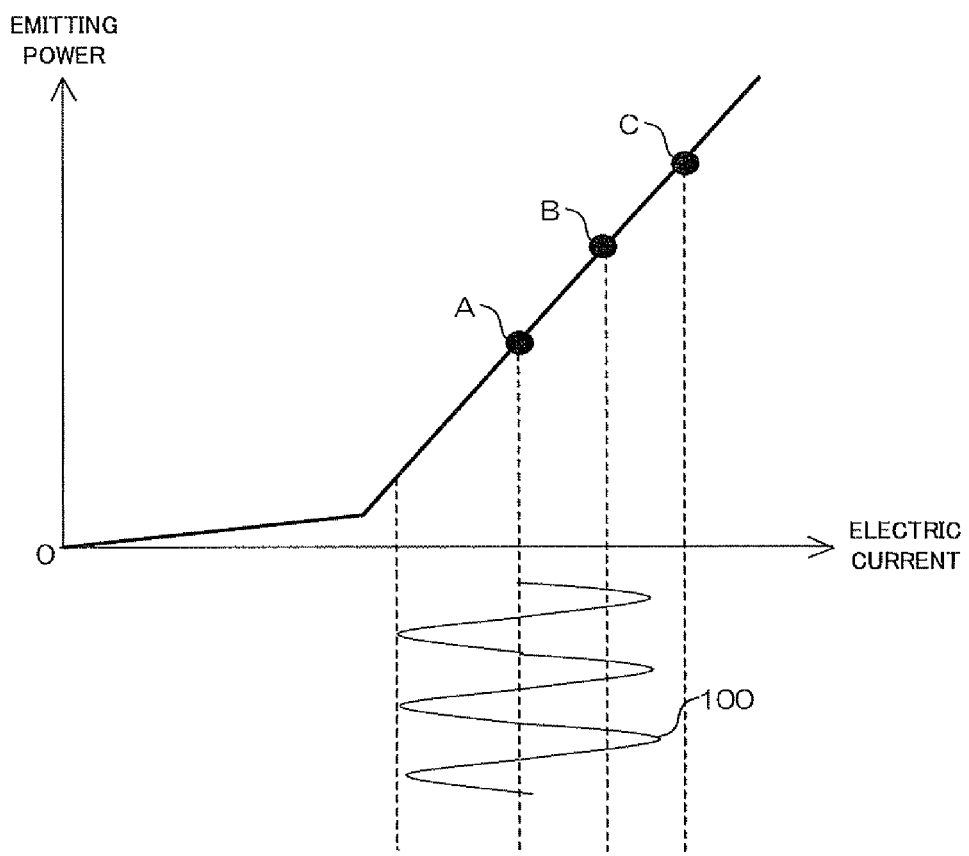
FIG. 3 is a view explaining an operating point for a harmonics superimposition signal according to the embodiment.

First, an embodiment according to the invention will be described with reference to FIG. 1 to FIG. 3. FIG. 1 is a block diagram showing a schematic arrangement of an optical pickup device according to an embodiment, FIGS. 2A and 2B are views showing the setting of an optical path according to the embodiment in the optical pickup device, and FIG. 3 is a view explaining an operating point for a harmonics superimposition signal according to the embodiment.

As shown in FIG. 1, an optical pickup device P1 according to the embodiment is arranged to comprise emitting units 1, and 2 as emitting means each of which is composed of a semiconductor laser or the like, light detecting units 3, and 4, beam splitters 5 to 7, a collimator 8, mirrors 9, and 10, an objective lens 11 as collecting means on which a cleaning film such as a photo-catalyst film is formed and which is for a high-density optical disc, an objective lens 12 as collecting lens on which a cleaning film such as a photo-catalyst film is formed and which is for a CD/DVD, an actuator 11A fixed to the objective lens 11, an actuator 12A fixed to the objective lens 12, a harmonics signal superimposing unit 14 as superimposing means, and a control unit 15 as setting means, superposition controlling means, and light emission controlling means. In this arrangement, a cleaning film formed on a surface of each of the objective lenses 11, and 12 is one which has a function of being activated by radiation of an optical beam B for a high-density optical disc (whose wavelength is 405 nm, for example), and cleaning a surface of each of the objective lens 11, and 12.

Now, an operation thereof will be described.

First, an operation of recording and reproducing information in and from a CD or a DVD by using the optical pickup device P1 will be schematically described. In the case where information is recorded and reproduced in and from a CD or a DVD, the emitting unit 1 for emitting an optical beam B for a high-density optical disc is not operated.

In the case where information is recorded and reproduced in and from a CD/DVD, first, based on a control signal Sv from the control unit 15, the harmonics single superimposing unit 14 generates a driving signal Svd for causing the emitting unit 2 to emit an optical beam D for a CD/DVD which has a wavelength of 645 nm, for example, and supplies it to the emitting unit 2. At this time, after the harmonics signal superimposing unit 14 superimposes a harmonics signal whose frequency is preset, it generates the control signal Svd, and supplies it to the emitting unit 2. The harmonics signal is superimposed to reduce a laser noise in a semiconductor laser which constitutes the emitting unit 2, and improve a S/N (Signal/Noise) ratio of a reproduction RF (Radio Frequency) signal.

The optical beam D for a CD/DVD emitted from the emitting unit 2 based on the driving signal Svd passes through the beam splitters 6, and 7, and is collimated by the collimator 8, and then, is reflected by the mirror 9, and impinges on the objective lens 12. The optical beam D is reflected by a signal recording surface 13A of an optical disc 13 (in this case, any one of a CD and a DVD) with the objective lens 12, a polarizing surface thereof is rotated, for example, and the optical beam D impinges on the objective lens 12 again. Then, the optical beam D as a reflective beam moves via the mirror 9, the collimator 8, the beam splitters 7, and 6, and is reflected by a splitting surface of the beam splitter 6 at this time, and impinges on a light receiving surface of the light detecting unit 4. By this arrangement, the light detecting unit 4 generates a detection signal Sdd corresponding to an intensity of the received optical beam D, and the light detecting unit 4 outputs it to the control unit 15, and also outputs it to a recording and reproducing unit or the like not shown for a necessary recording and reproducing process or the like.

When information is recorded and reproduced by using the optical beam D, a collecting position on the signal recording surface 13A is tracking-servo-controlled in a direction parallel to the signal recording surface 13A, and focus-servo-controlled in a direction perpendicular to the signal recording surface 13A, by an operation of the actuator 12A based on a servo signal Sad supplied from the control unit 15.

Now, a schematic operation in the case where information is recorded and reproduced in and from a high-density optical disc by using the optical pickup device P1 will be described. In the case where information is recorded and reproduced in and from a high-density optical disc, the emitting unit 2 is not operated.

In the case where information is recorded and reproduced in and from a high-density optical disc, first, the harmonics signal superimposing unit 14 generates a driving signal Svb for causing the emitting unit 1 to emit the optical beam B which has a wavelength of 405 nm, for example, for a high-density optical disc, based on the control signal Sv supplied from the control unit 15, and outputs it to the emitting unit 1. At this time, the harmonics signal superimposing unit 14 superimposes a harmonics signal of a preset frequency, in the same manner as recording and reproducing of information in and from a CD or a DVD, and then, generates the driving signal Svb, and outputs it to the emitting unit 1.

An optical beam B for a high-density optical disc emitted from the emitting unit 1 based on the driving signal Svb passes through the beam splitter 5, is reflected by the beam splitter 7, collimated by the collimator 8, and then, passes through the mirror 9, is reflected by the mirror 10, and impinges on the objective lens 11. The optical beam B is reflected by the signal recording surface 13A of the optical disc 13 (this case is a case of a high-density optical disc) with the objective lens 11, a polarizing surface thereof is rotated, for example, and the optical beam B impinges on the objective lens 11 again. Then, the optical beam B as a reflective beam moves via the mirrors 10, and 9, the collimator 8, the beam splitters 7, and 6, and is reflected by a splitting surface of the beam splitter 5 at this time, and impinges on a light receiving surface of the light detecting unit 3. By this arrangement, the light detecting unit 3 generates a detection signal Sdb corresponding to an intensity of the received optical beam B, and the light detecting unit 3 outputs it to the control unit 15, and also outputs it to a recording and reproducing unit or the like not shown for a necessary recording and reproducing process or the like.

When information is recorded and reproduced by using the optical beam B, a collecting position on the signal recording surface 13A is tracking-servo-controlled in a direction parallel to the signal recording surface 13A, and focus-servo-controlled in a direction perpendicular to the signal recording surface 13A, by an operation of the actuator 11A based on a servo signal Sab supplied from the control unit 15.

Referring now to FIG. 1, and FIGS. 2*a* and 2B, a cleaning operation of the objective lens 12 according to the embodiment will be described.

As schematically shown in FIG. 1, in a cleaning operation of the objective lens 12 according to the embodiment, a CD or a DVD is loaded as the optical disc 13, the optical beam D impinges on the signal recording surface 13A, and thereby, necessary information is recorded and reproduced. In parallel thereto, the control unit 15 controls the harmonics signal superimposing unit 14 in such a way that the emitting unit 1 emits the optical beam B. The harmonics signal superimposing unit 14 generates the driving signal Svb without superimposing a harmonics signal, and outputs it to the emitting unit 1. As a result, the optical beam B (on which a harmonics signal is not superimposed) emitted from the emitting unit 1 impinges on the objective lens 11 via the beam splitter 5, and 7, the collimator 8, and the mirror 9, and 10.

Here, when the objective lens 12 is cleaned, the position of the objective lens 11 is controlled by the control unit 15 through the actuator 11A in such a way that the positional relationship of the objective lens 11 with the objective lens 12 is as shown in FIGS. 2A, and 2B.

More concretely, as shown in FIGS. 2A, and 2B, where the distance between the objective lens 11 and the objective lens 12 is Lg, the effective diameter of the objective lens 11 is Lb, the thickness from the signal recording surface 13A of the optical disc 13 which is a CD or a DVD to the surface thereof is Dd, the operating distance of the objective lens 12 (so-called working distance) is Wd, the distance between the objective lens 11 and the objective lens 12 in a direction perpendicular to the signal recording surface 13A is Ls, the operating distance of the objective lens 11 is Wb, and the effective diameter of the objective lens 12 (actually, about 3 mm in diameter, for example) is Ld, $$Lg<[\{2\times(Dd+Wd)-Ls\}/(2\times Wb)-(1+Ld/Lb)]\times Lb \quad (1)$$

the positional relationship of the objective lens 11 with the objective lens 12 is controlled by the actuator 11A in such a way that the above equation (1) is met.

By maintaining this positional relationship during the recording and reproducing of information in which the objective lens 12 is used, the optical beam B emitted from the objective lens 11 and reflected by the signal recording surface 13A is radiated over the whole of the effective diameter Ld of the objective lens 12. Due to the fact that the relationship of the above equation (1) is met, the position of the objective lens 11 is controlled within a range where the distance shown by reference character Hx in FIG. 2A is "positive" (a range hatched in FIG. 2B), and therefore, the optical beam B is radiated over the whole of the effective diameter Ld of the objective lens 12. The optical beam B reflected by the signal recording surface 13A of a CD or a DVD is not in focus on the signal recording surface 13A, so it becomes to a scattering beam to impinge on the objective lens 12.

As a result, the optical beam B is radiated over the whole of the effective diameter Ld of the objective lens 12 during the recording and reproducing of information in which the objective lens 12 is used, and therefore, a cleaning film which is formed on a surface of the objective lens 12 is activated, so that the objective lens 12 is cleaned.

At this time, on the driving signal Svb for causing the emitting unit 1 to emit the optical beam B, a harmonics signal is not superimposed, as mentioned earlier. Generally, an emitting power of the optical beam B on which a harmonics signal is superimposed is an operating point A illustrated in FIG. 3. On the other hand, a rated operating point of the emitting unit 1 is an operating point C. By not superimposing a harmonics signal 100 on the driving signal Svb of the optical beam B, an emitting power of the optical beam B for cleaning the objective lens 12 can be improved from an emitting power corresponding to a usual operating point A (at the time when the harmonics signal 100 is superimposed) to an emitting power corresponding to an operating point B.

With regard to the cleaning of the objective lens 11 itself, by loading the optical disc 13 which is a high-density optical disc, and recording and reproducing information in and from the optical disc 13 in a usual way, the optical beam B is radiated on a cleaning film which is formed on a surface of the objective lens 11, and therefore, a cleaning process is automatically performed.

As mentioned above, according to a cleaning operation of the objective lens 12 in the optical pickup device P1 according to the embodiment, a cleaning film which is activated by radiation of the optical beam B and cleans the objective lens 12 is formed in an optical path of the objective lens 12, and an optical path of the optical beam B is set as shown in FIG. 2A in such a way that the optical beam B reflected by the optical disc 13 is radiated on the objective lens 12. Therefore, without adding a dedicated member for cleaning the objective lens 12, the objective lens 12 can be cleaned by using the optical beam B.

Further, since a cleaning film is also formed in an optical path of the objective lens 11, the objective lens 11 itself can be also cleaned when information is recorded and reproduced by using the optical beam B.

Therefore, it is possible to effectively prevent occurrence of trouble in the optical recording and reproducing of information due to the fact that the objective lenses 11 and 12 are contaminated, while not adding unnecessary parts, and while reducing a cost.

Further, since an optical path of the optical beam B is set in such a way that the optical beam B reflected by the optical disc 13 is radiated on the objective lens 12 when the optical beam D is collected by using the objective lens 12, the objective lens 12 is cleaned at a timing when the objective lens 12 is most contaminated, and therefore, it is possible to effectively prevent contamination of the object lens 12. Furthermore, since it is possible to perform the reproducing or the like of information in which the optical beam D is used, and the cleaning of the objective lens 12 at the same time, it is not necessary to drive the optical pickup device P1 only for cleaning the objective lens 12.

Further, since the superimposition of a harmonics signal on the optical beam B is prohibited when the objective lens 12 is cleaned by using the optical beam B, it is possible to radiate the optical beam B of higher power on the objective lens 12, and therefore, the cleaning of the objective lens 12 can be enhanced.

Furthermore, since an optical path of the optical beam B is set to meet the relationship shown in the above equation (1) when the objective lens 12 is cleaned using the optical beam B, it is possible to effectively clean a range of an effective diameter of the objective lens 12.

In the above embodiment, when the objective lens 12 is cleaned, by emitting the optical beam B on which a harmonics signal is not superimposed, a emitting power of the optical beam B for cleaning is improved. As another arrangement, it is also possible to arrange to provide the emitting unit 1 for emitting the optical beam B of a high power for recording, thereby emitting the optical beam B of a high power at the cleaning time. At this time, if the harmonics signal superimposing unit 14 is controlled so as to prohibit the superimposition of a harmonics signal, it is possible to radiate the emitted beam B of a higher power on the objective lens 12.

With this arrangement, since the optical beam B of power for recording is emitted when the objective lens 12 is cleaned by using the optical beam B, it is possible to radiate the optical beam B of a higher power on the objective lens 12, and therefore, it is possible to enhance the cleaning of the objective lens 12.

(II) Modification

Figure 4:
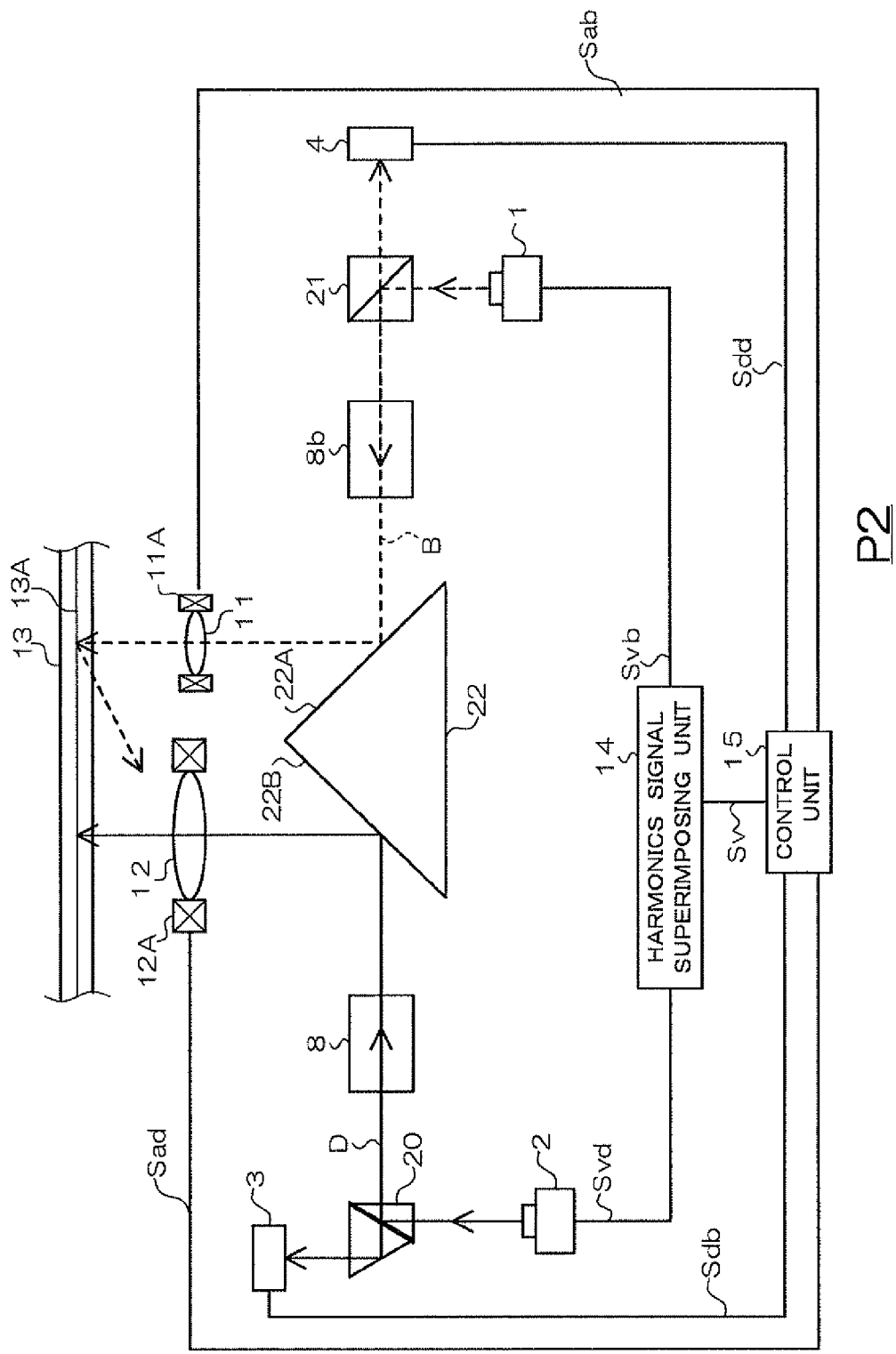
FIG. 4 is a block diagram showing an arrangement of an optical pickup device according to a modification.

Referring now to FIG. 4, a modification of the invention will be described. In FIG. 4, the same reference numerals are given to the same members as ones shown in FIG. 3, and an explanation of the details will be omitted.

It is also possible to apply the invention to the optical pickup device P1 which includes an arrangement explained with reference to FIG. 1, as well as, an optical pickup device P2 according to a modification which includes an arrangement shown in FIG. 4, for example.

In the optical pickup device P2 according to the modification, as shown in FIG. 4, first, when the optical beam B for a high-density optical disc is emitted from the emitting unit 1, it is reflected by a beam splitter 21, collimated by a collimator 8b, reflected by a reflective surface 22A of a mirror 22, collected by the objective lens 11, and radiated on the signal recording surface 13A of the optical disc 13 (the optical disc 13 as a high-density optical disc). Further, its reflected beam passes through the beam splitter 21 via the objective lens 11, the reflective surface 22A, and the collimator 8b, and impinges on a light-receiving surface of the light detecting unit 4.

On the other hand, when the optical beam D for a CD/DVD is emitted from the emitting unit 2, it is reflected by a beam splitter 20, collimated by the collimator 8, reflected by a reflective surface 22B of the mirror 22, collected by the objective lens 12, and radiated on the signal recording surface 13A of the optical disc 13 (the optical disc 13 as a CD/DVD). Further, its reflected beam is reflected by the beam splitter 20 via the objective lens 12, the reflective surface 22B, and the collimator 8, and impinges on a light-receiving surface of the light detecting unit 3.

Even in the optical pickup device P2 which includes such an arrangement, by setting the same optical path as the optical pickup device P1 according to the embodiment to the optical beam B at the cleaning time of the objective lens 12, it is possible to clean the objective lens 12 similarly with the optical pickup device P1.

Further, in the above embodiment and the above modification, a case where the present invention is applied to an optical pickup device which includes two kinds of the objective lenses 11 and 12 as an objective lens has been described. In addition thereto, it is also possible to apply the present invention to an optical pickup device which includes three or more kinds of objective lenses including at least the objective lens 11 for a high-density optical disc. In this case, at the time of recording and reproducing of information in which an objective lens other than the objective lens 11 for a high-density optical disc is used, by causing the position of the objective lens 11 and the emitting mode of the optical beam B with regard to the position of an objective lens used in recording and reproducing to be the same as the position of the objective lens 11 and the emitting mode of the optical beam B according to the embodiment respectively, it is possible to effectively realize the cleaning of a surface of an objective lens other than the objective lens 11.

Furthermore, in the above embodiment and the above modification, a case where the present invention is applied to an optical pickup device which controls two kinds of the objective lenses 11 and 12 independently of each other by the actuators 11A and 12A has been described. In addition thereto, it is also possible to apply the present invention to an optical pickup device in which two kinds of the objective lenses 11 and 12 are supported by one supporting body, and the supporting body is controlled by one actuator.

In this case, two kinds of the objective lenses 11 and 12 are supported by one supporting body in such away that when the objective lens 12 is positioned in the operating distance Wd, the distances Lg and Ls between the objective lenses 11 and 12 meet the above equation (1). Thus, it is possible to realize the cleaning of the surface of the objective lens 12, while preventing an increase of a cost of parts, and an increase in size of an optical pickup device.

The invention claimed is:

1. An optical pickup device which performing at least one of recording or reproducing of information in or from a recording medium by using an optical beam, comprising:
    two collecting devices, corresponding to two optical beams which have frequencies different from each other, on which cleaning films, which are activated by radiation of a first optical beam of the two optical beams and clean the two collecting devices, are formed; and
    a setting device which sets an optical path of the first optical beam in such a way that the first optical beam reflected by the recording medium is radiated on a second collecting device of the two collecting devices corresponding to a second optical beam of the two optical beams other than the first optical beam.

2. The optical pickup device according to claim 1, wherein, when a collecting operation of the second optical beam by the second collecting device is performed, the setting device sets the optical path in such a way that the first optical beam reflected by the recording medium is radiated on the second collecting device.

3. The optical pickup device according to claim 1, further comprising:
    a superimposing device which, when the at least one is performed by using the first optical beam, superimposes a harmonics signal having a preset frequency on the first optical beam; and a superimposition controlling device which, when the first optical beam is radiated on the second collecting device, controls the superimposing device in such a way that the super imposition of the harmonics signal on the first optical beam is prohibited.

4. The optical pickup device according to claim 1, further comprising:

an emitting device which emits the first optical beam for recording the information in the recording medium; and an emission controlling device which, when the first optical beam is radiated on the second collecting device, controls the emitting device in such a way that the first optical beam having a recording power is emitted.

5. The optical pickup device according to claim 1, wherein, when the optical path is set in such a way that the first optical beam reflected by the recording medium is radiated on the second collecting device, the setting device sets the optical path in such a way that the following equation is met:

$$Lg<[\{2\times(Dd+Wd)-Ls\}/(2\times Wb)-(1+Ld/Lb)]\times Lb$$

where a distance in a direction parallel to the recording medium between the collecting device corresponding to the first optical beam and the second collecting device to be cleaned is Lg, an effective diameter of a first collecting device of the two collecting devices corresponding to the first optical beam is Lb, a thickness from a surface to a signal recording surface of the recording medium for which the at least one is performed by using a second optical beam of the two optical beams is Dd, an operating distance of the second collecting device is Wd, a distance in a direction perpendicular to the recording medium between the first collecting device and the second collecting device to be cleaned is Ls, an operating distance of the first collecting device is Wb, and an effective diameter of the second collecting device is Ld.

* * * * *